US011490187B1

(12) United States Patent
Moore

(10) Patent No.: US 11,490,187 B1
(45) Date of Patent: Nov. 1, 2022

(54) WIRELESS HEADPHONES WITH INTEGRAL CAMERA

(71) Applicant: Eric Moore, Cary, NC (US)

(72) Inventor: Eric Moore, Cary, NC (US)

( * ) Notice: Subject to any disclaimer, the term of this patent is extended or adjusted under 35 U.S.C. 154(b) by 0 days.

(21) Appl. No.: 17/316,826

(22) Filed: May 11, 2021

(51) Int. Cl.
*H04R 1/08* (2006.01)
*H04R 1/10* (2006.01)
*H04N 5/225* (2006.01)

(52) U.S. Cl.
CPC ......... *H04R 1/1008* (2013.01); *H04N 5/2252* (2013.01); *H04R 1/08* (2013.01); *H04R 2420/07* (2013.01)

(58) Field of Classification Search
CPC ... H04R 1/00; H04R 1/02; H04R 1/08; H04R 1/083; H04R 1/10; H04R 1/1016; H04R 1/1075; H04R 1/1091; H04R 2420/07; H04R 1/1008; H04R 1/1041; H04R 1/1058; H04R 1/1066; H04R 2201/10; H04R 2201/107; H04N 5/2252; H04N 5/2257; H04M 1/0264; H04M 1/6033; H04M 1/6041; H04M 1/6066
See application file for complete search history.

(56) References Cited

U.S. PATENT DOCUMENTS

| 7,365,766 B1* | 4/2008 | Lapalme | H04N 7/18 348/61 |
| 8,204,435 B2 | 6/2012 | Seshadri | |
| 8,902,315 B2 | 12/2014 | Fisher | |
| 2010/0040245 A1* | 2/2010 | Buil | H04R 1/1041 381/375 |
| 2015/0146907 A1* | 5/2015 | Kulavik | H04R 1/1091 381/371 |
| 2021/0399911 A1* | 12/2021 | Jorasch | H04L 12/1822 |

FOREIGN PATENT DOCUMENTS

JP 2004356743 A * 12/2004 ............... H04R 1/00

* cited by examiner

*Primary Examiner* — Thang V Tran
(74) *Attorney, Agent, or Firm* — Sanchelima & Associates, P.A.; Christian Sanchelima; Jesus Sanchelima

(57) ABSTRACT

Wireless headphones with integral camera including a headphones assembly and a pivot arm assembly are disclosed. These assemblies in conjunction with one another provide a simple solution for video or teleconferencing. The headphones assembly includes speakers within a speaker housing surrounded by ear pads. The speakers are placed on either end of an adjustable headband to fit various user head sizes. The exterior of the speaker housing includes audio control buttons and a pivot arm mounted thereon. The pivot arm includes a forward-facing camera at an exterior distal end with respect to the speaker housing. The pivot arm also includes a self-facing camera with a microphone on the interior of said distal end. The included cameras can be toggled via a toggle button mounted to the pivot arm as well. The pivot arm is adjustable via a telescopic portion to modify camera angles.

14 Claims, 4 Drawing Sheets

WIRELESS HEADPHONES WITH INTEGRAL CAMERA

BACKGROUND OF THE INVENTION

1. Field of the Invention

The present invention relates to wireless and, more particularly, to wireless headphones with integral camera that can be used for video conferencing.

2. Description of the Related Art

Several designs for wireless headphones with integral camera have been designed in the past. None of them, however, include an extension arm that includes a self-facing camera with microphone.

Applicant believes that a related reference corresponds to U.S. Pat. No. 8,902,315 issued for a hands-free wireless wearable GPS enabled video camera and audio-video communications headset, mobile phone and personal media player. Applicant believes that another related reference corresponds to U.S. Pat. No. 8,204,435 issued for a wireless headphone set with an attached display and camera device. None of these references, however, teach of wireless headphones with integral camera that includes a self-facing and a forward-facing camera.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide wireless headphones with an integral camera including a pivoting arm with a microphone, self-facing camera, and a forward-facing camera.

It is another object of this invention to provide wireless headphones with an integral camera including a toggle button to switch between camera settings.

It is still another object of the present invention to provide wireless headphones with an integral camera to be used for videoconferencing in conjunction with a mobile communication device.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
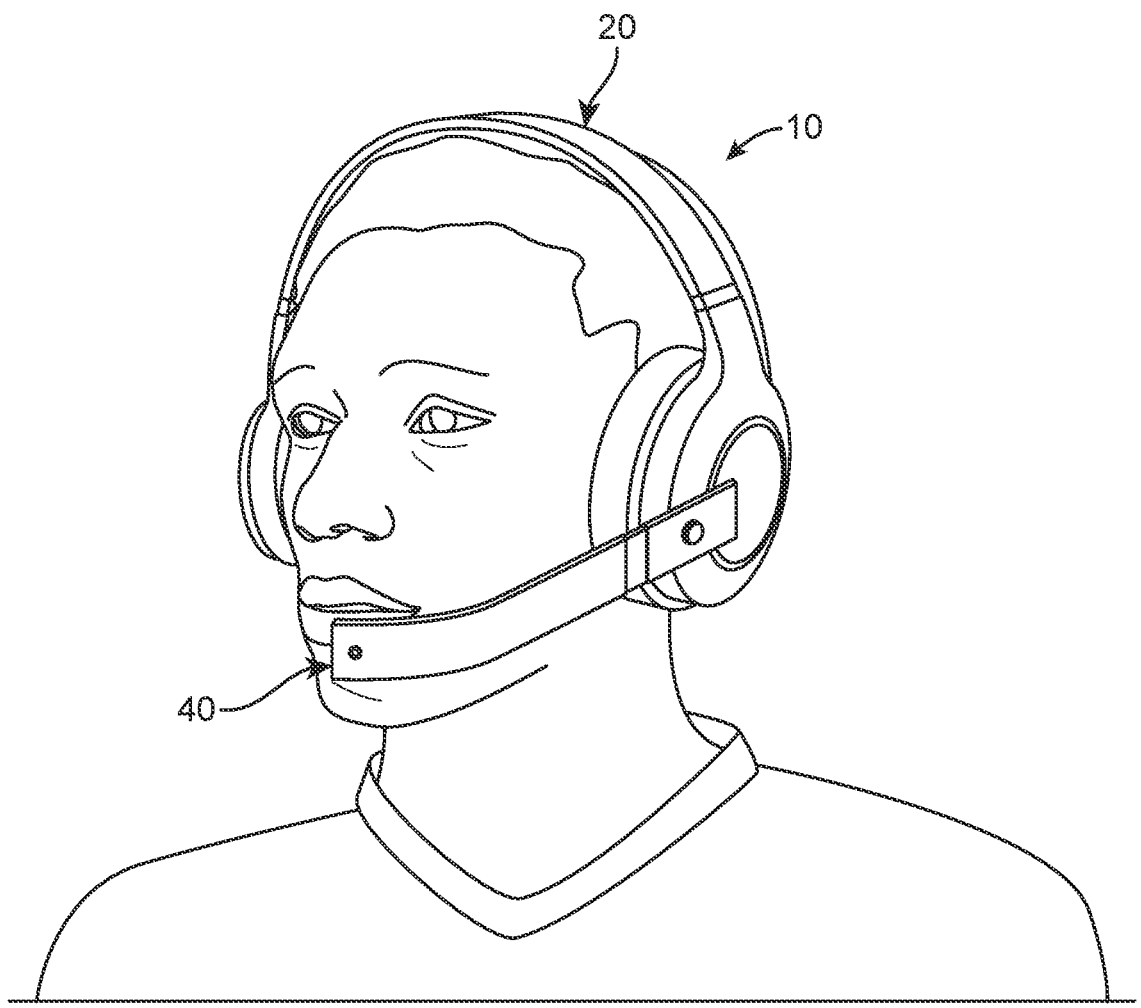
FIG. 1 represents an operational view of the wireless headphones with integral camera 10 being worn by a user.

Referring now to the drawings, where the present invention is generally referred to with numeral 10, it can be observed that it basically includes a headphones assembly 20 and a pivot arm assembly 40.

Figure 2:
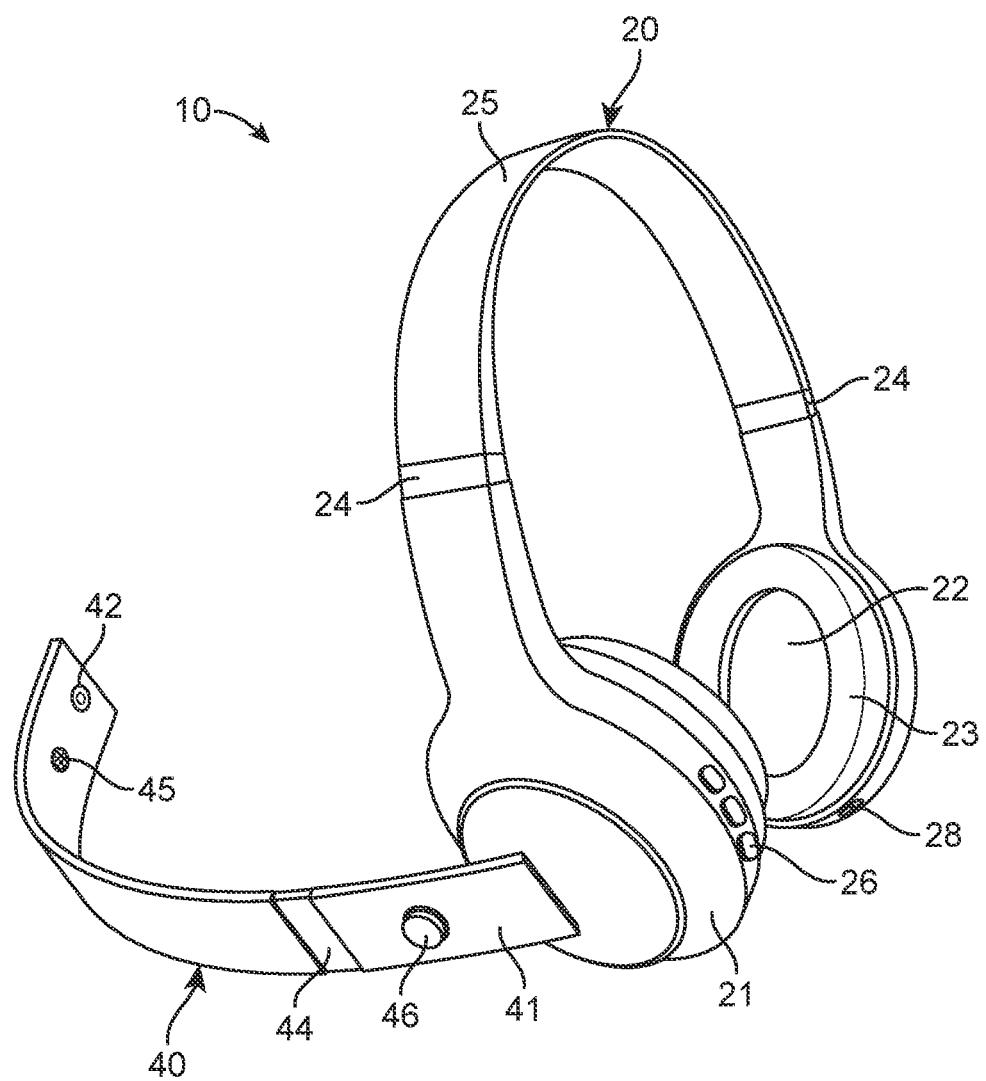
FIG. 2 shows an isometric view featuring the self-facing camera 42 and the microphone 45 of the pivot arm assembly 40.
Figure 3:
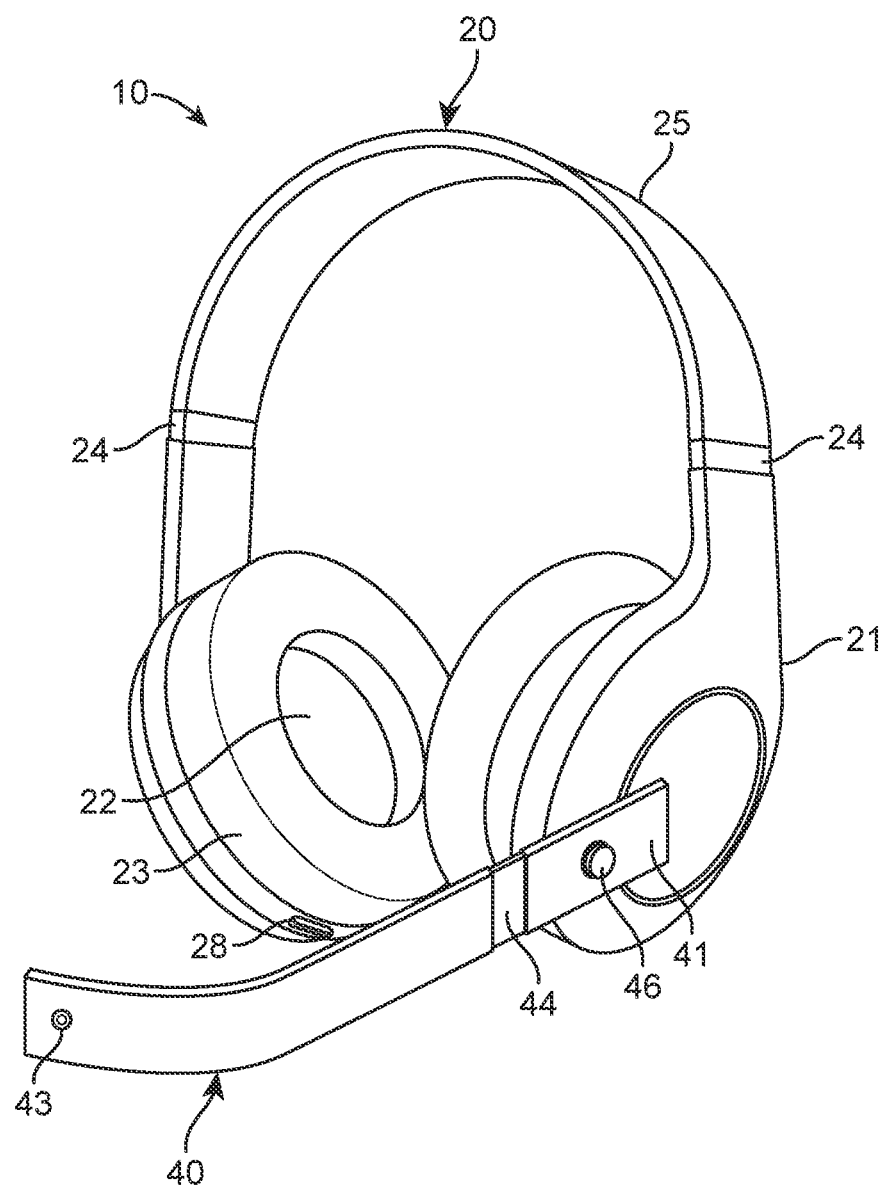
FIG. 3 illustrates a front view of the headphones assembly 20 featuring the forward-facing camera 43 and the charge port 28 located underneath the speaker housing 21.

As best illustrated in FIG. 2-3, headphones assembly 20 may include a speaker housing 21. The speaker housing 21 may be a pair of flat circular enclosures adapted to fit over a user's ears. The speaker housing 21 may include speakers 22 mounted therein. Encompassing the speakers 22 about an outer perimeter may be ear pads 23. The ear pads 23 may be a padded ring that allows for proximal placement of the speakers 22 to a user's ears while adding comfortability. Said speaker housing 21 may be mounted on opposing distal ends of a headband 25. The headband 25 may be a U-shaped member worn by a user and adjusted to various user head sizes via a slider 24. The slider 24 may function telescopically. Mounted to an exterior edge of the speaker housing 21 may be control buttons 26. The control buttons 26 may be a series of programmable buttons. Wherein the said control buttons 26 may be programmed to facilitate a variety of audio functions. The programmable audio functions may include play, pause, stop, forward, rewind, volume up, volume down. It may be suitable for the control buttons 26 to also be programmed to facilitate controlling phone call audio. It may be preferable for speaker housing 21 to include a charge port 28. The charge port 28 may take the form of a USB type C port. It should be understood that the charge port 28 may include any variation of power port that can be used to charge a battery 27. The battery may be housed within speaker housing 21.

As shown in FIG. 2-3, mounted to an exterior central portion of speaker housing 21 may be a pivot arm assembly 40. In one embodiment the pivot arm assembly 40 may include a pivot arm 41. The pivot arm 41 may be an elongated curved rectangular member. The curve may include an interior portion with a concave shape that is facing a user while in operation. It may be suitable for the pivot arm 41 to pivot up and down about the exterior central portion of the speaker housing 21. The pivot arm 41 may include a telescopic portion 44. The telescopic portion 44 may adjust the length of the pivot arm 41. The interior portion may also include a self-facing camera 42 and a microphone 45 mounted thereon. The self-facing camera 42 and the microphone 45 may be mounted at a distal end of pivot arm 41 with respect to headphones assembly 20. Pivot arm 41 may also include a forward-facing camera 43 mounted opposingly with respect to the self-facing camera 42. It may be suitable for the self-facing camera 42 and the forward-facing camera 43 to be actuated via a toggle button 46. Toggle button 46 may be a circular button mounted to an exterior of pivot arm 41.

Figure 4:
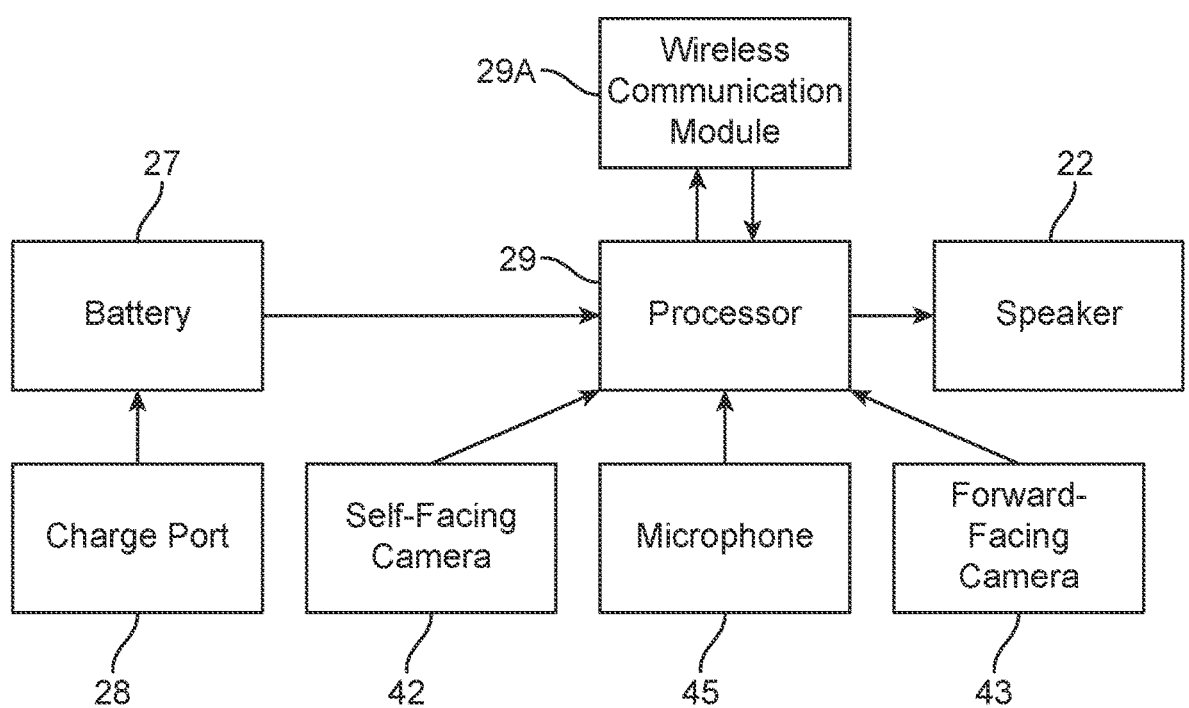
FIG. 4 is a representation of an electrical overview including a battery 27 powering a processor 29 and a wireless communication module 29A.

As depicted in FIG. 4, it may be preferable for battery 27 to serve as a power source for a processor 29. The processor 29 may receive user input via the control buttons 26, the toggle button 46, or through a wireless communication module 29A. The wireless communication module 29A may enable the user to communicate with the present invention 10 via Bluetooth, Wi-Fi, radio waves, or the like. It should be understood that any variation of wireless communication may be used with the wireless communication module. The wireless communication module 29A may allow for connectivity to a mobile device. Thereby enabling the user to control the present invention 10 via user input on said mobile device. The present invention 10 may allow for wireless phone call communication while using the headphones assembly 20 and microphone 45. The present invention 10 may also be used as a video conferencing device by toggling the toggle button 46 to actuate the self-facing camera 42 and/or the forward-facing camera 43.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for wireless headphones with integral camera, comprising:
   a. a headphones assembly including headphones, wherein said headphones includes a headband, and speakers within a speaker housing, the headphones include wireless connectivity and a battery housed therein; and
   b. a pivot arm assembly including a pivot arm, wherein said pivot arm is mounted to an exterior of the speaker housing, the pivot arm includes a microphone, a self-facing camera and a forward facing camera, said pivot arm having an elongated rectangular shape with a curvature that includes a concave side facing a user and a convex side, said microphone and said facing camera being mounted to the concave side on a distal portion of the pivot arm with respect to the headphones, the forward-facing camera being mounted to the convex side of the pivot arm opposite the self-facing camera.

2. The system for wireless headphones with integral camera of claim 1 wherein said headband includes a slider on both ends to vary the fit of the headphones on a user.

3. The system for wireless headphones with integral camera of claim 1 wherein said speakers are encompassed by a padded ring about a perimeter of the speakers.

4. The system for wireless headphones with integral camera of claim 1 wherein said speaker housing includes three control buttons mounted to an exterior edge of the speaker housing.

5. The system for wireless headphones with integral camera of claim 4 wherein said three control buttons are programmable.

6. The system for wireless headphones with integral camera of claim 1 wherein said battery is recharged via a charge port.

7. The system for wireless headphones with integral camera of claim 6 wherein said charge port is a USB C port.

8. The system for wireless headphones with integral camera of claim 1 wherein said pivot arm includes a telescopic portion to adjust the length of the pivot arm.

9. The system for wireless headphones with integral camera of claim 1 wherein said headphones assembly input and output signals are processed by a processor.

10. A system for wireless headphones with integral camera, consisting of:
    a. a headphones assembly including headphones, wherein said headphones includes a headband, the headband includes a slider on both ends to vary the fit of the headphones on a user, the headphones including speakers within a speaker housing, said speakers are encompassed by a padded ring about a perimeter of the speakers, the headphones include wireless connectivity and a rechargeable battery housed therein, the speaker housing includes three programmable control buttons mounted to an exterior edge thereon, said speaker housing including a USB C charging port; and
    b. a pivot arm assembly including a pivot arm, wherein said pivot arm is mounted to an exterior of the speaker housing, the pivot arm including a telescopic portion to vary the length of said pivot arm, the pivot arm having an elongated rectangular shape with a curvature that includes a concave side facing a user and a convex side, the pivot arm includes a microphone, a self-facing camera and a forward-facing camera, said microphone and self-facing camera being mounted to the concave side on a distal portion of the pivot arm with respect to the headphones, the forward-facing camera being mounted to the convex side of the pivot arm opposite the self-facing camera, said convex side including a toggle button.

11. A system for wireless headphones with integral camera, comprising:
    a. a headphones assembly including headphones, wherein said headphones includes a headband, and speakers within a speaker housing, the headphones include wireless connectivity and a battery housed therein; and
    b. a pivot arm assembly including a pivot arm, wherein said pivot arm is mounted to an exterior of the speaker housing, said pivot arm having an elongated rectangular shape with a curvature that includes a concave side facing a user and a convex side, the pivot arm includes a microphone, a self-facing camera and a forward-facing camera, said microphone and self-facing camera being mounted to the concave side on a distal portion of the pivot arm with respect to the headphones, the forward-facing camera being mounted to the convex side of the pivot arm opposite the self-facing camera.

12. The system for wireless headphones with integral camera of claim 11, wherein said headband includes a slider on both ends to vary the fit of the headphones on a user.

13. The system for wireless headphones with integral camera of claim 11 said speaker housing includes three control buttons mounted to an exterior edge of the speaker housing, wherein said three control buttons are programmable by means of a processor.

14. The system for wireless headphones with integral camera of claim 11, wherein said battery is recharged via a charge port.

* * * * *